Oct. 8, 1940.   H. FOCKE   2,217,108
ROTATING-WING AIRCRAFT
Filed Aug. 23, 1938   2 Sheets-Sheet 1

Inventor:
Henrich Focke
By Watson, Cole, Grindle & Watson

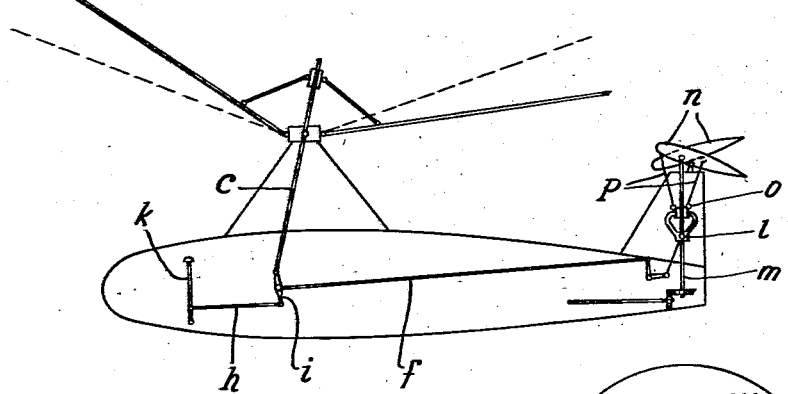
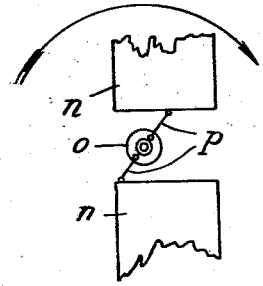
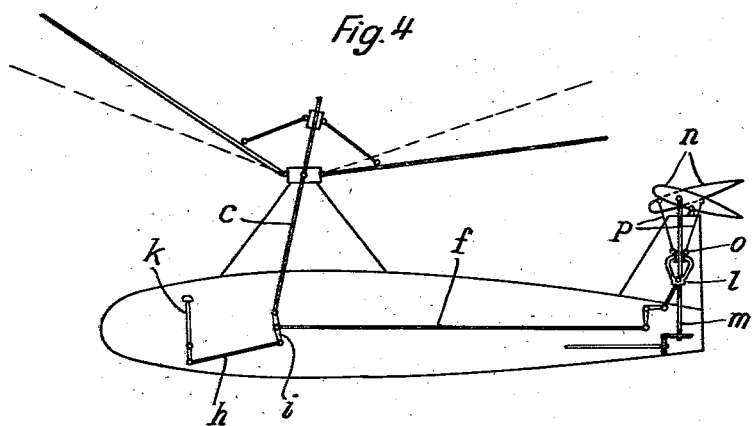

Patented Oct. 8, 1940

2,217,108

UNITED STATES PATENT OFFICE 2,217,108

ROTATING-WING AIRCRAFT

Henrich Focke, Bremen, Germany

Application August 23, 1938, Serial No. 226,399
In Germany May 23, 1938

10 Claims. (Cl. 244—18)

In rotating-wing aircraft with wing blades jointedly connected to the hub, the position of their resultant air-force is dependent in a very definite manner upon the speed of the aircraft, the speed of revolution, the blade weight, the total weight, the angle of incidence of the blades relatively to the axis and certain secondary influences. If the said values are once determined, the stability factor of the rotor of such an aircraft can no longer be varied at will. With increasing speed, the resultant air force travels forwardly through certain determined amounts.

This means that the influence of the rotor upon the total stability of such a rotating-wing aircraft is likewise invariably determined. If it is desired to vary these stability factors in order to achieve a certain desired stability behaviour of the aircraft, it is necessary to interfere artificially with the longitudinal equilibrium.

The object of the invention is to permit of this by the influencing of additional organs in dependence upon the position of the resultant air force of the rotor for the time being. It is based upon the recognition that the position of the plane of movement of the blades has a fixed relation to the position of the resultant air force such that the resultant air force is substantially the bisector of the angle between the direction of the blades located forwardly and rearwardly in the direction of flight. If, therefore, the inclination of the plane of movement of the blades or, better, of the flat cone of movement of the blades, is caused to act through a suitable arrangement upon an additional organ, for example the horizontal fin or elevator, influencing the stability, then the total stability of the aircraft is no longer determined solely by the resultant air force of the rotor. On the contrary, this additional organ is so influenced by the variation of the inclination of the cone of movement of the blades that the total stability can be made larger or smaller, to a desired extent, than that of the rotor alone by means of suitable leverage in the transmission between the parts concerned.

Further features of the invention will appear from the following description of certain embodiments of the invention illustrated in the accompanying drawings diagrammatically only and by way of example.

Figure 1:
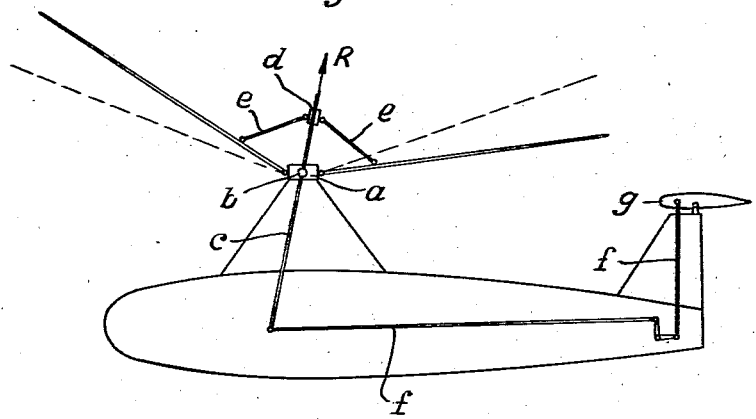
Figure 2:
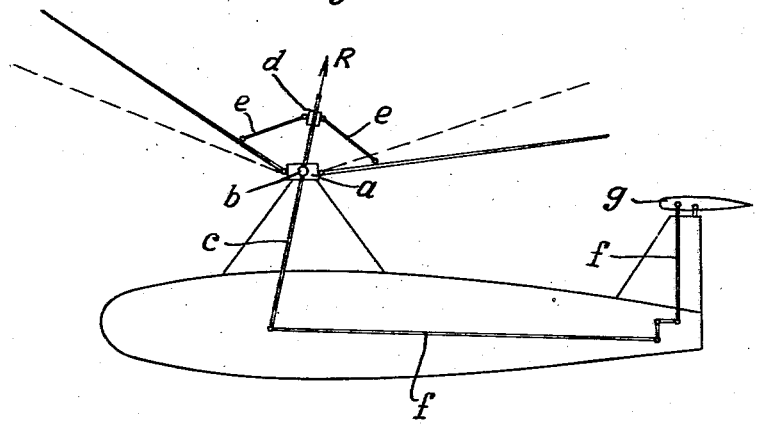

Fig. 1 is a diagrammatic side elevation of an aircraft in which the control surface is so operated as to reduce the natural stability of the rotor, Fig. 2 differs from Fig. 1 in that the control surface is so operated as to increase the natural stability of the rotor, Fig. 3 is a diagrammatic side elevation of an aircraft with a rotating control surface, which is operated with the same purpose as that of Fig. 1.

Fig. 3a is a plan to a larger scale of the central parts of the rotating control surface of Figs. 3 and 4, all self-evident constructional parts being omitted for sake of clearness, and Fig. 4 differs from Fig. 3 in that the rotating control surface, is operated with the same purpose as that of Fig. 2.

In Fig. 1, a rod $c$, upon which the sleeve $d$ can slide up and down, is mounted in the middle of the rotor hub $a$ so as to be swingable about the point $b$. To this sleeve $d$ are jointed the inner ends of the rods $e$ the outer ends of the rods $e$ being jointed to the rotor blades. If the aircraft has no forward speed, the blade-movement, as is known, is symmetrical, as indicated by broken lines. The rod $c$ then stands vertical. If forward flight occurs, the cone of blade movement and, therewith, the rod $c$, becomes tilted rearwardly. The size of the cone angle itself can vary as desired, the sleeve $d$ simply sliding up or down on the rod $c$. Jointed to the lower end of the rod $c$ is a linkage $f$ which includes a bell-crank lever and is operatively connected with the horizontal fin $g$.

With the arrangement illustrated, the following stability conditions obtain: As stated, the rod $c$ also indicates substantially the direction R of the resultant air force of the rotor. As is known, the forward travel of the resultant with the speed produces stable behaviour of the aircraft, since this forward travel tends to put up the nose of the aircraft and therefore to reduce the speed. In the illustrated arrangement of Fig. 1, the fin is set at a larger angle by the forward travel of the resultant, that is to say by the forward swing of the lower part of the rod $c$, this counteracting the stabilising moment produced by the forward travel itself. This arrangement reduces accordingly the otherwise fixedly determined natural stability of the rotor. It is readily evident that any desired degree of stability down to zero can be attained by appropriate selection of the lever arms.

If, on the other hand, the arrangement of Fig. 2 is selected, in which the bell-crank lever of the linkage is reversed, then the forward travel of the resultant, or of the rod $c$ produces a reduction of the angle of incidence of the horizontal fin $g$. In this fashion, the natural stability of the rotor is further increased by the fin. Here also, selfevidently, the amount of this increase of stability can be determined by the choice of the lever arms.

In the form illustrated in Figs. 1 and 2, however, the arrangement has the disadvantage that it becomes ineffective with rotating-wing aircraft of very low speed or even with a helicopter when motionless, since the fin is then no longer effective. Accordingly, a modified arrangement is shown in Fig. 3 which is based upon the idea of imparting a proper motion to the control surface also in order that it shall itself remain effective even without forward speed of the aircraft. In this manner, it is then possible at the same time to utilise such a control surface also for elevational control. In this case, the rod c is pivotally connected to the upper end of a lever i which is connected at its lower end by the rod or link h to the stick k. The linkage f is pivotally connected with the middle of the lever i and operates, through its bell-crank, a sleeve l which can slide upon the vertical shaft m. The latter is driven from the engine, and carries the rotatable control surface n. This surface n is divided into two parts, as is clearly seen from the plan view in Fig. 3a, wherein the direction of rotation is indicated by an arrow. Both halves of the divided control surface can be adjusted after the fashion of an adjustable airscrew, in their angle of incidence relatively to the axis m. For example, each half may be connected by a link p with a rotating ring part o which is engaged by the sleeve l. The action for the production of a determinable total stability now essentially proceeds precisely in the fashion already described with reference to Fig. 1 or Fig. 2. If the stick k is initially imagined to be held by the pilot, then the rod c moves the sleeve l through the linkage f and thereby adjusts the rotating control surface in such manner, that in Fig. 3 the total stability is reduced, since the control surface produces an upwardly directed force.

Corresponding to Fig. 2, Fig. 4 represents the arrangement wherein the inherent stability of the rotor is increased for the whole aircraft.

If, with the position of the rod c assumed unaltered, the stick k is operated by the pilot in the usual fashion, then the rotating control surface n acts, as will readily be evident, in the normal way as an elevational control means, this moreover even if the aircraft hovers motionless in one place.

It will be apparent to those skilled in the art that the invention can be applied to rotating-wing aircraft with one or more rotors.

I claim:

1. In a rotating-wing aircraft of the type described the combination with a rotating wing whose cone of rotation automatically assumes a position with its axis substantially in alignment with the resultant of all air forces acting on the blades thereof, and with a tail elevator having adjusting means, of means positively responsive to the inclination of said axis, and a linkage operatively associating said responsive means and said adjusting means.

2. In a rotating-wing aircraft, a rotor including a hub and blades freely linked to said hub, the axis of the cone of rotation of said rotor being permitted to assume a position solely dependent on the air forces acting on the rotor, an elevational control for said aircraft, and means controlled by the axis position for automatically adjusting the said elevational control of the aircraft in a predetermined relationship to the actual position of the blade cone axis.

3. In a rotating-wing aircraft, a rotor including a hub and blades freely linked to said hub, the axis of the cone of rotation of said rotor being permitted to assume a position solely dependent on the air forces acting on the rotor, an elevational control for said aircraft, and means controlled by the axis position for automatically adjusting the said elevational control of the aircraft in such a predetermined relationship to the actual position of the blade cone axis that the longitudinal stability of the aircraft is increased.

4. In a rotating-wing aircraft, a rotor including a hub and blades freely linked to said hub, the axis of the cone of rotation of said rotor being permitted to assume a position solely dependent on the air forces acting on the rotor, an elevational control for said aircraft, and means controlled by the axis position for automatically adjusting the said elevational control of the aircraft in such a predetermined relationship to the actual position of the blade cone axis formed by rotation of said freely linked blades that the longitudinal stability of the aircraft is reduced.

5. In a rotating-wing aircraft, a rotor hub, rotor blades freely hinged to said hub at least in a vertical direction, a rod pivoted in the center of said hub about a transverse axis, articulated connections between said rod and the rotor blades whereby the rod assumes a position at the axis of the cone of rotation of the blades, a horizontal control surface, and an operative connection between said rod and the said horizontal control surface, said cone of rotation being free to assume the position dictated by the aerodynamic forces acting on the rotor.

6. In a rotating-wing aircraft of the type comprising a rotor having blades adapted to rotate in a cone, a hub for said blades mounted to rotate about a fixed axis, means for permitting free vertical swinging of the blades to change the angle of the cone axis solely in response to aerodynamic conditions, a rod passing through said hub and tiltably mounted about a transverse axis therein, articulated connections between said rod and the rotor blades whereby the rod is maintained in the cone axis, a horizontal control surface for said aircraft, and an operative connection between said rod and the said horizontal control surface.

7. In a rotating-wing aircraft of the type comprising revoluble horizontal control surfaces, means for adjusting the incidence of said control surfaces, a rotor having blades adapted to rotate in a cone, a hub for said blade mounted for rotation about a fixed axis, means for permitting free vertical swinging of the blades to change the angle of the cone axis in response to aerodynamic conditions, a rod passing through said hub and tiltably mounted about a transverse axis therein, articulated connections between said rod and the rotor blades whereby the rod is maintained in the cone axis, and an operative connection between said rod and said incidence adjusting means.

8. In a rotating-wing aircraft of the type described, the combination with a rotor hub, rotor blades freely hinged to said hub at least in a vertical direction to permit the cone formed by the rotation of the blades to assume a position dictated solely by aerodynamic conditions, and an adjustable horizontal control surface remote from the rotor, of a rod tiltably mounted about a transverse axis, means connecting said rod and rotor blades whereby the rod is automatically positioned at the axis of the cone, a control stick, differential means combining the motions of the rod and control stick, and means transmitting said motion to actuate the said control surface.

9. In a rotating-wing aircraft of the type described, the combination with a rotor hub, rotor blades freely hinged to said hub at least in a vertical direction to permit the cone formed by the rotation of the blades to assume a position dictated solely by aerodynamic conditions, revoluble horizontal control surfaces remote from said rotor, and means for adjusting the incidence of said control surfaces, of a rod tiltably mounted about a transverse axis, means connecting said rod and rotor blades whereby the rod is automatically positioned at the axis of the cone, a control stick for manual operation, differential means combining the motions of the rod and of the control stick, and means transmitting said combined motion to adjust the incidence of said control surfaces.

10. A device as defined in claim 8 in which the differential motion combining means is a floating lever.

HENRICH FOCKE.